Sept. 3, 1935. G. L. CHERRY 2,013,404
METHOD OF AND APPARATUS FOR VULCANIZING MATERIAL ON ARTICLES
Filed Dec. 3, 1930
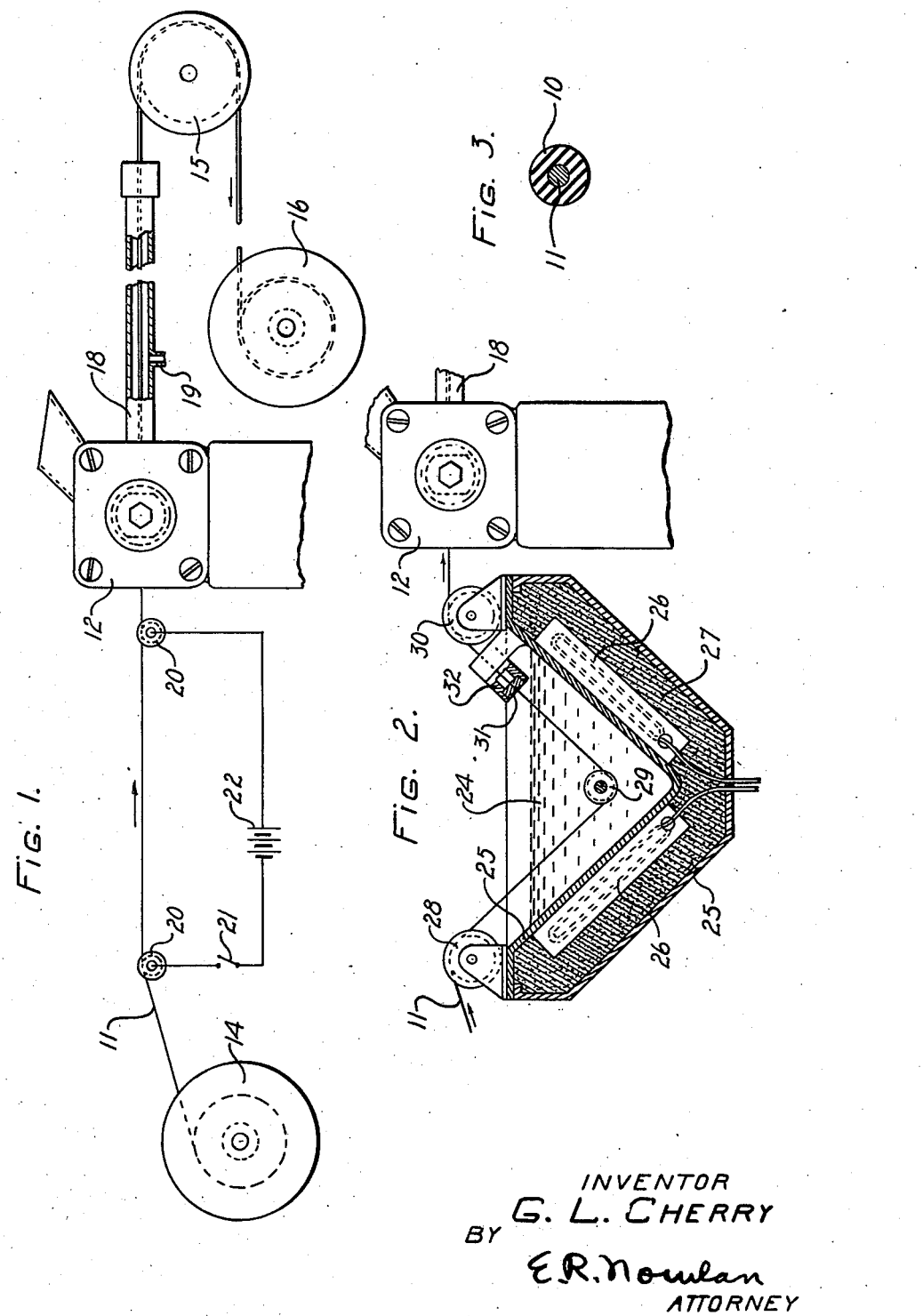
INVENTOR
G. L. CHERRY
BY
E. R. Nowlan
ATTORNEY Patented Sept. 3, 1935

2,013,404

UNITED STATES PATENT OFFICE 2,013,404

METHOD OF AND APPARATUS FOR VULCANIZING MATERIAL ON ARTICLES

George L. Cherry, La Grange, Ill., assignor to Western Electric Company, Incorporated, New York, N. Y., a corporation of New York Application December 3, 1930, Serial No. 499,670

17 Claims. (Cl. 18—6)

This invention relates to methods of and apparatus for vulcanizing material on articles, and more particularly to methods of and apparatus for vulcanizing a rubber insulation on wire.

Objects of the invention are to improve, simplify and expedite the vulcanization of materials on articles.

The invention contemplates the provision of a method of and apparatus for vulcanizing materials on articles, wherein the article is subjected to an electrical current or to a heated liquid bath to heat it immediately before the vulcanizable material is applied thereon, and all or a portion of the heat necessary to induce vulcanization is obtained by conduction from the heated article. In one embodiment of the invention, a rubber insulation is vulcanized on wire by passing an electrical current through the wire to pre-heat it and then extruding a covering of uncured rubber compound on the heated wire, the covering being vulcanized on the wire by heat conducted from the heated wire. Any necessary additional heat to induce vulcanization may be obtained by subjecting the applied covering to a controlled heating medium, such as steam under pressure. In another embodiment of the invention, the wire is pre-heated and/or treated by passing it through a heated liquid bath immediately before extruding the rubber covering thereon.

It is believed that a complete understanding of the invention will be had from the following detailed description, when read in conjunction with the acompanying drawing, wherein Fig. 1 is a diagrammatic elevational view, partly in section, of one form of apparatus embodying the features of the invention and by means of which the improved method may be practiced;

Fig. 2 is a fragmentary sectional view showing another form of apparatus embodying the invention; and Fig. 3 is an enlarged cross sectional view of a wire having a rubber insulating covering vulcanized thereon in accordance with the present invention.

In the accompanying drawing, one embodiment of the invention is diagrammatically illustrated in conjunction with an apparatus for continuously applying and vulcanizing a rubber insulating covering 10 (Fig. 3) on an electrical conductor or wire 11. The apparatus comprises an insulating head 12 of any suitable type adapted to extrude or otherwise apply under pressure a continuous uniform covering of a plastic rubber compound on the wire as it is drawn through the insulating head from a supply reel 14. The rubber insulated wire passes around a capstan 15 which delivers it to a take-up reel 16, the capstan being driven, by means not shown, at a predetermined speed which is coordinated with the extruding speed of the insulating head 12.

In accordance with the present invention, the wire is pre-heated by subjecting it to an electrical heating current or to a heated liquid bath immediately before the rubber compound is applied thereto, whereby all or a portion of the heat necessary to induce vulcanization in the rubber covering is obtained by conduction from the heated wire. When the heat conducted from the wire is insufficient to completely vulcanize the rubber covering, the necessary additional heat may be obtained by subjecting the covered wire to a controlled heating medium, such as steam under pressure. For example, when a relatively thick covering of rubber compound is applied on the wire, the heat conducted from the pre-heated wire may be sufficient to vulcanize only the layer or portion of the rubber compound immediately adjacent the wire. In such instances, the covered wire may be passed through an auxiliary vulcanizing chamber 18 (Fig. 1), wherein steam or any other suitable heating medium is admitted through an inlet 19, the heating medium in the chamber being maintained at a predetermined temperature and under a predetermined pressure, as may be required to complete the vulcanization of the rubber covering.

In the embodiment of the invention shown in Fig. 1, the wire is pre-heated by passing an electrical heating current therethrough before it enters the insulating head 12. This may be acomplished by passing the wire over two or more spaced metallic rollers 20 connected through a control switch 21 to a suitable source of electrical energy, such as a battery 22. Thus, it will be understood that an electrical current is passed through ever-changing portions of the wire as it passes over the contact rollers 20, the current being sufficient to heat the wire to the predetermined temperature necessary to induce vulcanization in the rubber covering subsequently extruded upon the heated wire by the insulating head 12.

In the embodiment of the invention shown in Fig. 2, the wire is pre-heated by passing it through a heated liquid bath 24 contained in a suitable container 25 and maintained at a predetermined temperature by electrical heating elements 26 embedded within a suitable insulating material 27 in a lower compartment of the container. The heating element may be connected to any suitable source of electrical energy (not shown). The wire passes over grooved rollers or sheaves 28, 29 and 30 which guide it through the liquid bath 24 and then into the insulating head 12. Upon emerging from the liquid bath 24 and before entering the insulating head 12, the wire may be passed through a die or wiper 31 mounted in a bracket 32 attached to the container 25.

In some instances, it may be desirable to treat the surface of the wire or apply a metallic or non-metallic coating thereto before extruding the rubber compound thereon, in order to insure an intimate bond between the wire and the rubber covering. This may be accomplished either before, during, or immediately after the pre-heating of the wire. For example, in the embodiment of the invention shown in Fig. 2, the wire may be pre-heated and simultaneously tinned by passing it through a molten bath of tin. If necessary, the wire may be heated further or cooled to a predetermined temperature after passing through the tinning bath. Also, in some instances it may be desirable to heat the wire before it is subjected to the tinning bath.

It is to be understood that the invention is not limited to the specific embodiment thereof herein illustrated and described, except in so far as is defined by the appended claims.

What is claimed is:

1. The method of vulcanizing material on articles, comprising heating and simultaneously tinning a surface of an article, and then applying a vulcanizable material to the heated and tinned surface.

2. The method of vulcanizing material on articles, comprising subjecting an article to a heated tinning bath to heat and simultaneously apply a coating of tin to a surface of the article, and then applying a vulcanizable material to the heated and tinned surface.

3. The method of vulcanizing rubber insulation on wire, comprising passing the wire through a tinning bath to treat a surface thereof, heating the treated surface, and then extruding a vulcanizable rubber compound on the heated and treated surface.

4. The method of forming and vulcanizing a covering on wire which comprises the steps of passing the wire through a bath of heated liquid to charge the wire with an amount of heat sufficient to effect vulcanization from within in vulcanizable material applied thereto and simultaneously to modify the surface of the wire, and subsequently applying and forming a covering of vulcanizable material on the hot wire.

5. The method of forming and vulcanizing a covering on wire which comprises the steps of passing the wire through a bath of molten metal to charge the wire with an amount of heat sufficient to effect vulcanization from within in vulcanizable material applied thereto and simultaneously to modify the surface of the wire, and subsequently applying and forming a covering of vulcanizable material on the hot wire.

6. In an apparatus for continuously applying and forming a covering of vulcanized material on wire, means to advance the wire through the apparatus, means comprising a bath of heated liquid to charge the wire with an amount of heat sufficient to effect vulcanization from within in vulcanizable material applied thereto and to simultaneously modify the surface of the wire, and means to continuously apply and form a covering of vulcanizable material on the hot wire.

7. In an apparatus for continuously applying and forming a covering of vulcanized material on wire, means to advance the wire through the apparatus, means comprising a bath of molten metal to charge the wire with an amount of heat sufficient to effect vulcanization from within in vulcanizable material applied thereto and to simultaneously modify the surface of the wire, and means to continuously apply and form a covering of vulcanizable material on the hot wire.

8. The method of forming and vulcanizing a covering on wire which comprises the steps of passing the wire through a bath of heated liquid to charge the wire with an amount of heat sufficient to effect vulcanization from within in vulcanizable material applied thereto and simultaneously to modify the surface of the wire, subsequently applying and forming a covering of vulcanizable material on the hot wire, and subsequently applying heat to the exterior surface of the covering to effect vulcanization therein from without.

9. The method of forming and vulcanizing a covering on wire which comprises the steps of passing the wire through a bath of molten metal to charge the wire with an amount of heat sufficient to effect vulcanization from within in vulcanizable material applied thereto and simultaneously to modify the surface of the wire, subsequently applying and forming a covering of vulcanizable material on the hot wire, and subsequently applying heat to the exterior surface of the covering to effect vulcanization therein from without.

10. In an apparatus for continuously applying and forming a covering of vulcanized material on wire, means to advance the wire through the apparatus, means comprising a bath of heated liquid to charge the wire with an amount of heat sufficient to effect vulcanization from within in vulcanizable material applied thereto and to simultaneously modify the surface of the wire, means to continuously apply and form a covering of vulcanizable material on the hot wire, and means to heat the exterior of the covering to effect vulcanization therein from without.

11. In an apparatus for continuously applying and forming a covering of vulcanized material on wire, means to advance the wire through the apparatus, means comprising a bath of molten metal to charge the wire with an amount of heat sufficient to effect vulcanization from within in vulcanizable material applied thereto and to simultaneously modify the surface of the wire, means to continuously apply and form a covering of vulcanizable material on the hot wire, and means to heat the exterior of the covering to effect vulcanization therein from without.

12. In an apparatus for continuously applying and forming a covering of vulcanized material on wire, means to advance a wire through the apparatus and a bath of molten metal through which the wire passes to charge the wire with an amount of heat sufficient to effect vulcanization from within in vulcanizable material applied thereto and at the same time to modify the surface of the wire, in combination with an extrusion device to apply and form a covering of vulcanizable material continuously on the hot wire, and means to heat the exterior of the covering to effect vulcanization therein from without.

13. In an apparatus for continuously applying and forming a covering of vulcanized material on wire, means to advance a wire through the apparatus and a bath of molten metal through which the wire passes to charge the wire with an amount of heat sufficient to effect vulcanization from within in vulcanizable material applied thereto and at the same time to cover the wire with metal from the bath, in combination with an extrusion device to apply and form a covering of vulcanizable material continuously on the hot wire, and means to heat the exterior of the vulcanizable covering to effect vulcanization therein from without.

14. In an apparatus for continuously applying and forming a covering of vulcanized material on wire, means to advance a wire through the apparatus and a bath of molten metal containing tin through which the wire passes to charge the wire with an amount of heat sufficient to effect vulcanization from within in vulcanizable material applied thereto and at the same time to coat the wire with tin, in combination with an extrusion device to apply and form a covering of vulcanizable material continuously on the hot wire, and means to heat the exterior of the vulcanizable covering to effect vulcanization therein from without.

15. The method of forming and vulcanizing a covering on wire which comprises the steps of passing the wire through a bath of molten metal to coat the wire with metal and at the same time to charge the wire with an amount of heat sufficient to effect vulcanization from within of a vulcanizable material applied thereto, subsequently applying and forming a covering of a vulcanizable material on the hot wire, and subsequently applying heat to the exterior surface of the covering to effect vulcanization therein from without.

16. The method of forming and vulcanizing a covering on wire which comprises the steps of passing the wire through a bath of molten tin to coat the wire with tin and at the same time to charge the wire with an amount of heat sufficient to effect vulcanization from within of a vulcanizable material applied thereto, subsequently applying and forming a covering of a vulcanizable material on the hot wire, and subsequently applying heat to the exterior surface of the covering to effect vulcanization therein from without.

17. The method of insulating conductors which comprises continuously passing a conductor through a bath of heated liquid to charge successive increments of the conductor with an amount of heat sufficient to effect vulcanization from within of vulcanizable material applied thereto and to modify the surface of the conductor, extruding a covering of a vulcanizable compound on the hot conductor, and then continuously advancing the covered conductor through a vulcanizing zone to effect vulcanization of the covering compound from the exterior thereof.

GEORGE L. CHERRY.